United States Patent [19]

Hendry

[11] Patent Number: 5,028,377

[45] Date of Patent: Jul. 2, 1991

[54] METHOD FOR INJECTION MOLDING PLASTIC ARTICLE WITH GAS-ASSISTANCE

[75] Inventor: James W. Hendry, Brooksville, Fla.

[73] Assignee: Michael Ladney, Mt. Clemens, Mich.

[21] Appl. No.: 488,980

[22] Filed: Mar. 5, 1990

[51] Int. Cl.⁵ .................. B29C 45/00; B29D 22/00
[52] U.S. Cl. .................... 264/572; 264/161; 264/328.7; 264/328.8; 264/328.12; 264/328.13; 425/812
[58] Field of Search ............... 264/40.3, 328.1, 328.8, 264/328.12, 328.13, 500, 572, 85, 328.7, 40.5, 161; 425/140, 546, 564, 568, 812, 542, 577, 149

[56] References Cited

U.S. PATENT DOCUMENTS 4,101,617 7/1978 Friederich ..................... 264/572
4,129,635 12/1978 Yasuike et al. .................. 264/45.5
4,740,150 4/1988 Sayer ........................ 264/572 X
4,830,812 5/1989 Kauer ......................... 264/572
4,855,094 8/1989 Hendry ........................ 264/40.3
4,923,667 5/1990 Sayer .......................... 264/572

FOREIGN PATENT DOCUMENTS 48-20023 6/1973 Japan ......................... 264/328.7

Primary Examiner—Leo B. Tentoni
Attorney, Agent, or Firm—Brooks & Kushman

[57] ABSTRACT

A method and apparatus for injection molding plastic articles with gas-assistance wherein the injected molten plastic is depressurized by a controlled amount prior to gas injection to facilitate the penetration of the gas into the molten plastic within the article-defining cavity of the mold.

12 Claims, 4 Drawing Sheets

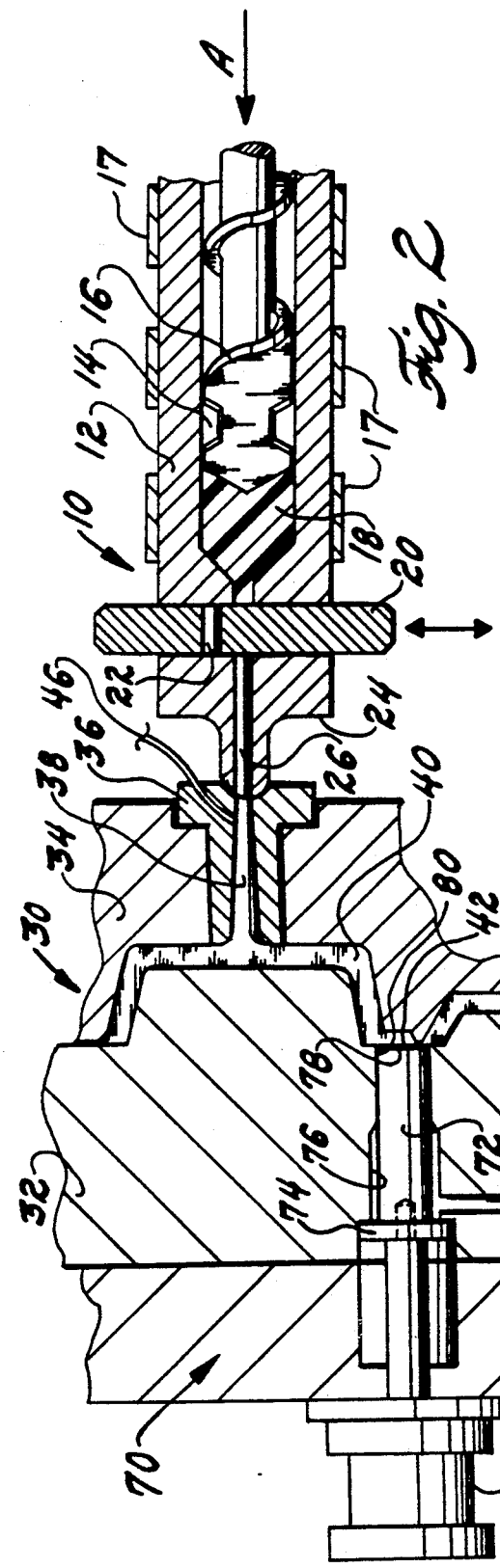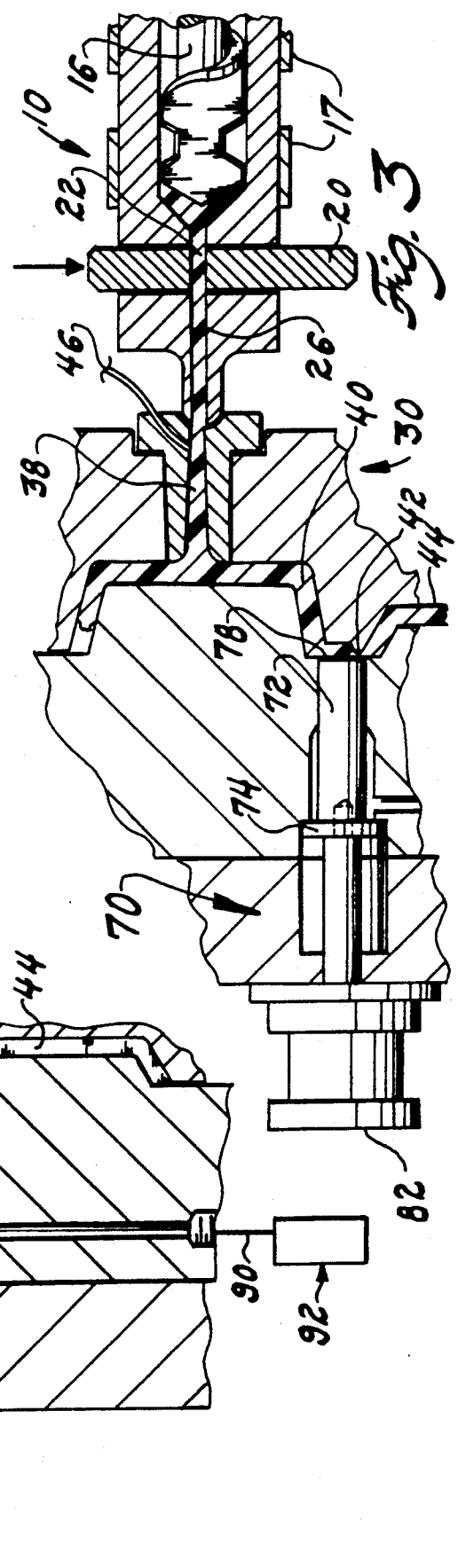

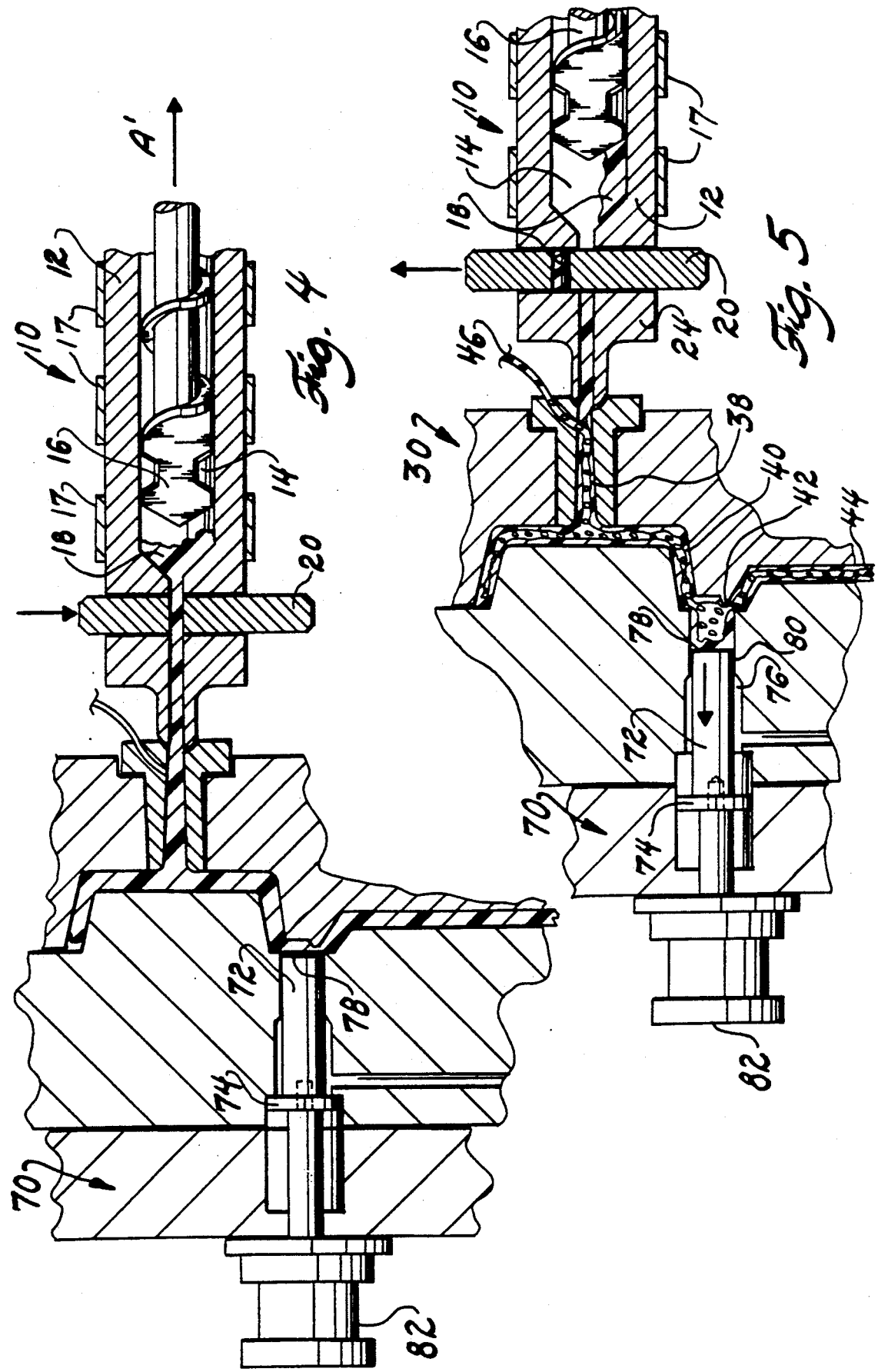

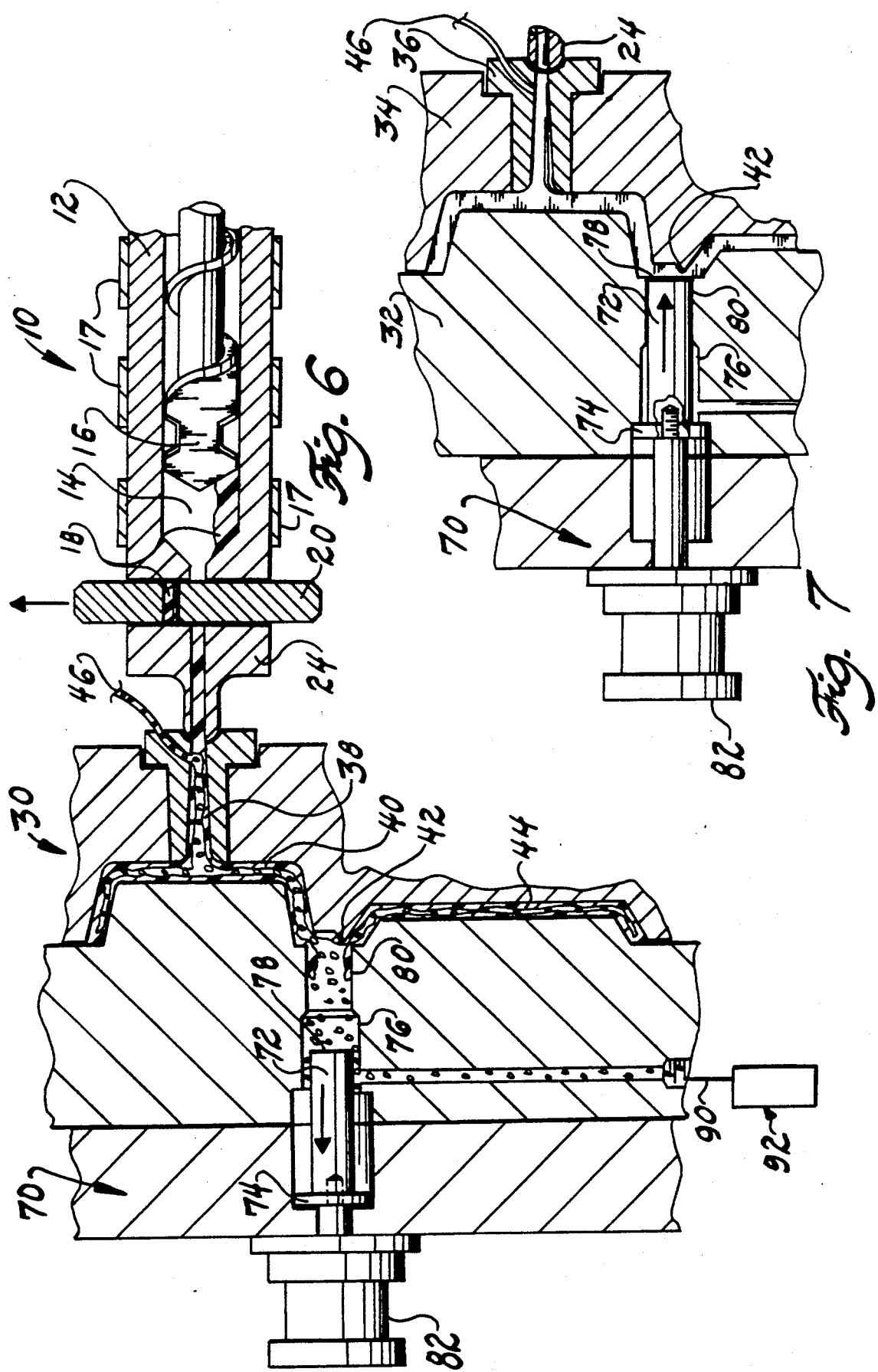

METHOD FOR INJECTION MOLDING PLASTIC ARTICLE WITH GAS-ASSISTANCE

TECHNICAL FIELD

This invention relates to a method and an apparatus for plastic injection molding articles with gas-assistance.

BACKGROUND ART

In a conventional plastic injection molding process a charge of molten plastic is injected under pressure from a molding machine through a flow path into the article-defining cavity of a mold. A standard injection molding machine uses a hydraulic ram to apply the plastic injection pressure, which may be up to 20,000 psi. The plastic flow path includes the nozzle of the injection molding machine, and within the mold the flow path may include the sprue, runners and gates, depending on the complexity of the mold.

The use of gas-assistance in plastic injection molding has attracted increasing commercial interest in recent years. The function of the gas is to penetrate the molten plastic resin and exert an internal pressure to urge the plastic into intimate contact with the walls of the article-defining cavity in the mold. The use of gas-assistance yields several advantages in plastic injection molding, including reducing or eliminating sink marks in the surface of the molded article, saving weight and resin consumption, shortening cycle times, and reducing clamp tonnages on the mold. The basic process of plastic injection molding with gas-assistance is disclosed in U.S. Pat. No. 4,101,617 to Friederich, issued July 18, 1978, and assigned to the assignee of the present invention.

One of the important challenges to the molding engineer in making effective use of gas-assistance is in determining a proper gas injection pressure. If the gas injection pressure is too low, the gas will be unable to displace the pressurized molten plastic in the flow path, and entry of the gas into the article-defining cavity of the mold will be impeded or blocked by the plastic in the flow path. If the gas injection pressure is too high, it will penetrate the mass of molten plastic but may not be containable internally of the plastic, i.e., the gas may rupture or blow-out from within the plastic mass and result in a malformed article in the mold cavity. Alternatively, the gas may be contained within the plastic, but may migrate from ribs and thick sections into thin areas where it can have deleterious cosmetic (e.g. pressure marks and shadows) and structural effects (e.g. internal strains).

The inertial resistance of the plastic to movement by the gas is therefore a factor in determining the gas injection pressure. Once the injected gas overcomes this inertial resistance it penetrates into the fluent center of the molten plastic within the article-defining cavity and performs its intended effects. Yet, if the gas injection pressure is too great, the gas cannot be contained within the mass of molten plastic and will rupture or "blow-out" the plastic, or migrate within the plastic beyond the gas channels designed into the article and manifest itself as a cosmetic and structural defect.

The objective of the inventor was to address the resistance presented by the plastic to entry of the gas into the article-defining cavity. The present invention provides a molding process and related apparatus toward the end of permitting gas assistance to be used with improved control over the penetration and containment of the gas within the injected plastic.

DISCLOSURE OF THE INVENTION

The present invention is an improved method and apparatus for injection molding a plastic article with gas-assistance through a plastic depressurization step which reduces the pressure of the molten plastic in the plastic flow path preparatory to gas injection. The depressurization facilitates displacement of the plastic in the flow path to permit the gas to enter the article-defining cavity with greater process control.

In one embodiment of the invention, the injected plastic is depressurized through a controlled retraction of the injection ram in the injection molding machine. The ram is retracted after the charge of molten plastic is injected under normal injection pressure through a flow path and into the article-defining cavity of a mold. The retraction causes an incremental increase in the volume occupied by the molten plastic and a corresponding decrease in the plastic pressure. The retraction of the injection ram tends to draw a quantity of plastic back from the flow path. The plastic displaced by retraction of the ram is plastic which would have had to be displaced in the flow path by the gas in order for the gas to enter the article-defining cavity. A conventional shut-off valve in the molding machine nozzle may be closed subsequent to retraction to stabilize the pressure in the flow path. The gas is then injected at a selected point and finds the resistance to entry of the gas into the article-defining cavity to be reduced.

In alternative embodiments of the invention, the depressurization step may be accomplished with other reciprocable members which can be retracted to effectively increase the volume of the plastic flow path. In one such example, the plastic may be depressurized in the area of the gate by use of a reciprocable pin which can be retracted to cause an effective increase in the volume occupied by the plastic. Still further, the pin can have a second stage of retraction to vent the mold of pressurized gas upon solidification of the article in the mold cavity.

An advantage of the present invention is the reduced risk of non-entry of the gas into the article-defining cavity, or, at the other extreme, the rupture or "blow-out" of the plastic due to excessive gas pressure. An important practical advantage of the method is the ability to operate the gas equipment at lower pressures, and obviate the need of gas pressure multiplier devices and the like. These advantages are important in the adaptation of a gas-assisted injection molding process to the volume production of high-quality, commercially acceptable, plastic molded articles.

BRIEF DESCRIPTION OF THE DRAWINGS

FIG. 2 is a schematic view in cross-section of plastic injection molding apparatus of the present invention shown at the beginning of the molding cycle.

FIG. 3 is a partial view of the apparatus of FIG. 1 showing the plastic injection step of the method of the present invention;

FIG. 4 is a partial view of the apparatus of FIG. 1 showing the plastic depressurization step of the method of the present invention;

FIG. 5 is a partial view of the apparatus of FIG. 1 showing the gas injection step of the method of the present invention;

FIG. 6 is a partial view of the apparatus of FIG. 1 showing the gas venting step of the method of the present invention; and FIG. 7 is a partial view of the apparatus of FIG. 1 showing the step of removing any residual plastic from the area of the mold adjacent the gate 42 in preparation for another cycle of operation.

BEST MODE FOR CARRYING OUT THE INVENTION

Figure 1:
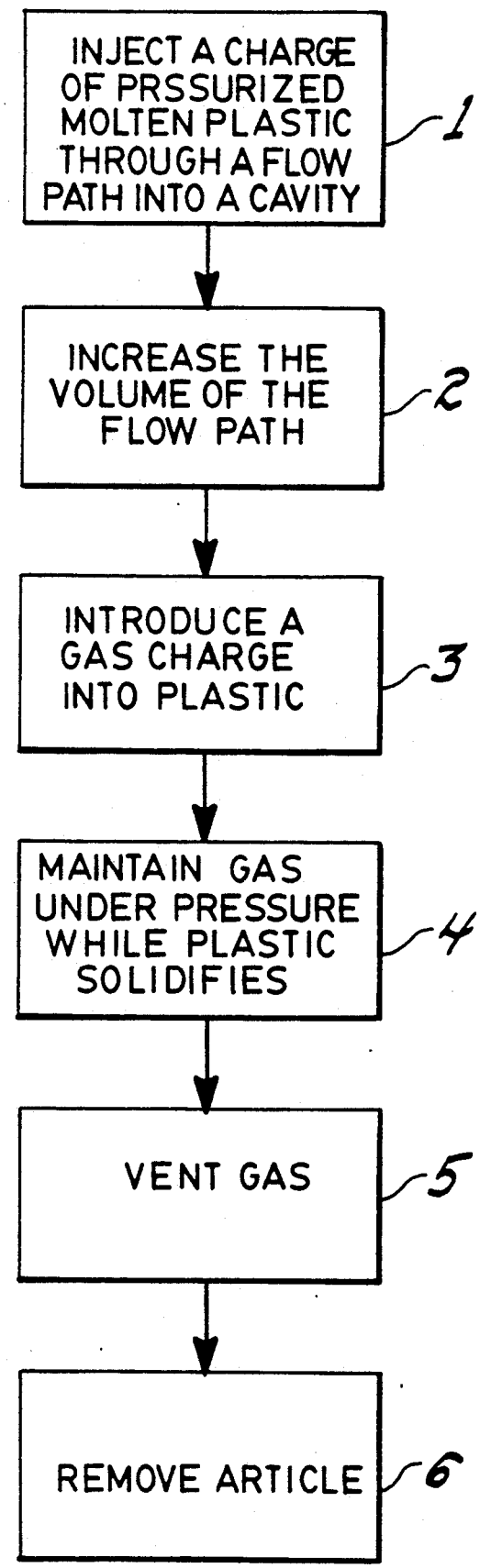
FIG. 1 is a flow chart of the process steps of the method of the present invention.

FIG. 1 is a flow chart illustrating the process steps of the present invention over a molding cycle.

In step 1, a charge of molten plastic is injected under pressure through a flow path into the article-defining cavity of a mold. This step is conventional, and may be accomplished by a usual plastic injection molding machine in which a measured amount of plastic granules are melted into a molten plastic mass by a screw within a barrel. The rotation of the screw and the heater bands heat and melt the plastic and advances it toward a chamber at the nozzle end of the machine. The injection of the molten plastic mass then occurs by opening a valve at the nozzle end of the machine and advancing the screw as an injection ram by hydraulic, electrical, or mechanical force. The advancement of the ram in turn applies the plastic injection pressure which forces the molten plastic mass through the flow path and into the article-defining cavity of the mold.

In step 2, the volume of the flow path is increased, and the molten plastic is thereby depressurized by a controlled amount. More practically, this is carried out by retracting a reciprocable member to cause an increase in the volume of the flow path. In one embodiment of the invention, this may be accomplished by retraction of the injection ram. In another embodiment, this may be done by retracting a reciprocable pin whose tip defines a portion of the boundary surface of the runner.

In step 3, a charge of pressurized gas is introduced into the molten plastic. The gas is pressurized at a predetermined level sufficient to displace the plastic in the flow path to allow the gas to enter the cavity, but not so great as to rupture the plastic mass or to cause the gas to escape from channels designed into the article. The predetermined pressure is lower than what would otherwise be required if the plastic had not been depressurized in the manner of step 2. The gas may be introduced through any one of known methods and apparatus, including those described in U.S. Pat. No. 4,101,617 or U.S. Pat. No. 4,855,094.

In step 4, the gas is maintained under pressure while the plastic solidifies within the mold. The pressurized gas functions internally of the plastic to urge the surfaces of the article into intimate contact with the walls of the article-defining cavity to reduce or avoid sink marks and otherwise enhance the surface quality of the article.

In step 5, the gas is vented after plastic solidification. The gas venting step may be carried out in alternative ways. In a conventional manner, the gas may be vented by separating the machine nozzle from the mold, as disclosed in U.S. Pat. No. 4,101,617. In a novel method of the present invention, the gas may be vented by a second stage retraction of the reciprocable pin in the runner area of the mold.

In step 6, the finished plastic article is removed from the mold in a conventional manner.

FIG. 2 illustrates in relevant detail apparatus for practicing the method of the present invention.

A conventional plastic injection molding machine is shown in relevant portion at 10. The plastic injection molding machine 10 includes a barrel 12 with an internal, cylindrical opening 14. The cylindrical opening 14 contains a screw 16 which is rotational to knead, melt and advance plastic granules into a molten mass, as shown at 18. The rotation of the screw 16 and the heater bands 17 heat and melt the plastic granules and advances the fluent mass 18 toward the nozzle end of the machine. The screw 16 is also reciprocable to inject the molten plastic mass 18 under a plastic injection pressure applied by conventional means, such as hydraulic, electrical or mechanical forces applied on the screw 16 in the direction of the arrow A to advance it toward the nozzle end of the machine.

A nozzle shut-off valve 20 is interposed between the cylindrical opening 14 and a nozzle 24. The nozzle 24 has a central passage 26 which is in communication with the cylindrical opening 14 through a passageway 22 when the valve 20 is moved downward into its open position. In FIG. 2 the valve 20 is in its closed, upward position to shut-off flow of molten plastic 18 from the cylindrical opening 14 to the nozzle 24.

A mold assembly, indicated generally at 30, comprises mold halves 32 and 34 which are held together during the times in the molding cycle of plastic injection and solidification by conventional clamp mechanisms at tonnages matched to the plastic injection pressure and gas pressure.

The mold half 34 is fitted with a sprue bushing 36. The sprue bushing mates with the machine nozzle 24, and receives molten plastic through the alignment of the nozzle passageway 26 with a sprue opening 38.

The sprue opening 38 communicates with a runner system 40 having upper and lower branches. The upper branch of the runner system 40 is in this case closed at its terminus, but could be opened to supply molten plastic to an article-defining cavity. The lower branch of the runner system 40 in this case connects with a gate 42 at the entrance of an article-defining cavity 44. The flow path for the molten plastic is thus defined as the head of the cylindrical opening 14, the valve passageway 22, the nozzle passageway 26, the sprue opening 38, the runner system 40 and the gate 42.

A gas injection line 46 is connected to the sprue opening 38 through a passageway in the sprue bushing 36. The gas injection line 46 is a schematic representation of the equipment configuration used to inject gas in the apparatus and method disclosed in U.S. Pat. No. 4,855,094.

A retractable pin assembly, indicated generally at 70, is fitted in the mold half 32 in the area of the gate 42 to the article-defining cavity 44. The retractable pin assembly 70 includes a cylindrical pin 72 with a head 74 which is movably connected with a fluid-operated cylinder 82. The working tip 78 of the pin functions as a boundary surface of the runner 40 in the area of the gate 42. The pin 72 is received within a bore 76. The diameter of the bore 76 is reduced to define a collar 80 in the area of the working tip 78 to allow a sealed, sliding fit. However, the diameter of the bore 76 rearward of the collar increases to effect a as passageway from the gate 42 to a recovery line 90 when the pin 72 is retracted from the collar 80. The gas recovery line 90 couples to a gas recovery kit, indicated schematically at 92.

In summary, FIG. 2 shows apparatus for carrying out the method of the present invention at the stage in the molding cycle preparatory to plastic injection.

FIG. 3 illustrates in schematic form the step of injecting the molten plastic mass 18 through the flow path into the article-defining cavity 44 of the mold 30. FIG. 3 corresponds to step 1 of FIG. 1.

In this step the shut-off valve 20 is indexed to its open position. The screw 16 is advanced and functions as a ram to force the molten plastic mass 18 through the valve opening 22, nozzle opening 26, sprue opening 38, runner system 40 and gate 42 and into the article-defining cavity 44. The extractor pin 54 is in its extended position contiguous with the runner 40, and molten plastic is captured in the recess 62. Similarly, the pin 72 is in its extended position. The gas line 46 is closed during the plastic injection step.

FIG. 4 illustrates in schematic form the plastic depressurization step. FIG. 4 corresponds to step 2 of FIG. 1.

More specifically, after the plastic injection step is completed, i.e. after the screw 16 has reached its forward stroke position, and the molten plastic has traversed the flow path and entered the article-defining cavity 44, the plastic is depressurized by a controlled amount by increasing the volume of the plastic path.

One method of accomplishing the volume increase is to retract the screw 16 as indicated by the arrow A' in FIG. 4. The face of the screw 16 effectively defines a boundary surface of the plastic flow path.

An alternative or companion means by which the volume of the plastic flow path may be increased is by an initial retraction of the pin 72. The tip 78 of pin 72 also defines a boundary surface of the flow path. The pin 72 is retracted within the range of the collar 80 to avoid escape of the molten plastic into the bore 76.

The amount by which the volume of the plastic flow path is increased is a function of the volume to be occupied by the gas. In the example discussed above, the screw 16 and the pin 72 are retracted by complementary amounts. However, in another example, the volume increase could be effected by retraction of the pin 72 alone. In such case the retraction of the pin would be more pronounced than the relatively small retraction evident from inspection of FIGS. 4 and 5.

FIG. 5 illustrates schematically the gas injection step. FIG. 5 corresponds to step 3 of FIG. 1.

The initial operation in FIG. 5 is movement of the shut-off valve 20 to its closed position. If retraction of the screw 16 is used as a means for plastic depressurization, the closure of the shut-off valve 20 occurs immediately after retraction of the screw. If retraction of the pin 72 is used as the means for plastic depressurization, the shut-off valve 20 should be moved to its closed position before pin retraction. The nozzle end face of the shut-off valve 20 is effectively substituted as a fixed boundary surface of the flow path.

A charge of gas is then introduced through line 46 into the sprue opening 38. The gas is pressurized at a predetermined level sufficient to first move and then penetrate the plastic at the point of interface in the sprue. Once the gas penetrates through the plastic surface it migrates through the sprue 38, runner system 40 and gate 42, and into the article-defining cavity 44. The path of least resistance for the pressurized gas is the hotter, more fluent interior of the plastic within the mold.

As previously mentioned, the objective of the plastic depressurization step is to lower the resistance of the plastic to displacement by the gas to facilitate entry of the gas to facilitate entry of the gas into the article-defining cavity. The lowering of the predetermined pressure level at which the gas is introduced minimizes or avoids the risk of rupture or blowout of the plastic by the gas. Further, the gas may be contained within the plastic with greater control, and migration of the gas from its distribution channel within the article, e.g. ribs and thick sections, into thin surface areas is similarly avoided.

Further with reference to FIG. 5, after the charge of pressurized gas has been introduced into the molten plastic, the plastic within the article-defining cavity 44 is allowed to cool and solidify while the gas is maintained under pressure. This corresponds to step 4 of FIG. 1.

Upon solidification of the article in the cavity 44, the pressurized gas within the molding must be vented, either to ambient or recovered for repressurization in a subsequent molding cycle. The gas ventilation step may be carried out by a number of alternative procedures.

One such procedure which is known in the art is the separation of the machine nozzle 24 from the mold 30. A procedure of this type is disclosed in U.S. Pat. No. 4,101,617, and is sometimes referred to as "sprue break." Many commercial types of plastic injection molding machines permit the barrel 12 to be retracted on a carriage (not shown) to separate the machine 10 from the mold 30. This action "breaks" the sprue. This technique is predicated on the presence of the gas channel proximate to or extending through the upstream end of the sprue.

Another alternative technique for gas ventilation, and possibly recovery, is through use of a second stage of retraction of the pin 72 as indicated in FIG. 6. The step of venting the pressurized gas is carried out by mechanical interruption of the plastic in the flow path by extraction of a segment of plastic to relieve internal gas pressure. The pin 72 is indicated in a second retracted position wherein the radial gap or clearance between the bore 76 and the pin 72 serves as a passageway for gas. The retraction of the pin beyond the collar area 80 leaves the wall of plastic in the area of the gate unsupported, and the plastic may burst spontaneously under the internal gas pressure.

The gas escaping through the clearance between the pin 72 and the bore 76 may escape to ambient or may be recaptured through the gas recovery line 90 and recovery mechanism 92 shown in FIG. 2.

FIG. 7 shows the step of removing residual plastic material in collar area 80 by advancing the pin 72 by the cylinder 82 until it has reached its same position as illustrated in FIGS. 2-4. This is in preparation for another cycle of operation.

Finally, the article is removed from the mold cavity 44 by separation of the mold halves 32 and 34. Typically, the mold half 32, known as the core side of the mold, is retracted and the article is removed with assistance of conventional ejector pins (not shown). The residual plastic material (shown as 18' in FIG. 5) in the shut-off valve and at the forward end of the cylindrical opening in the barrel 12, is still hot and fluent and will form part of the plastic charge in the next molding cycle.

The invention has been described in exemplary embodiments, and it is understood that alternative embodiments will suggest themselves to persons of skill in the art without departing from the scope of the appended claims.

The embodiments of the invention in which an exclusive property or privilege is claimed are defined as follows:

1. In an apparatus for injection molding, a method of injection molding a plastic article with gas-assistance, the method comprising the steps of:

injecting a pressurized charge of molten plastic through a flow path having a volume at least partially defined by a movable part of the apparatus and into an article-defining cavity of a mold;

then depressurizing the molten plastic in the flow path by a controlled amount after the injection step by moving the movable part;

then introducing a charge of gas pressurized at a predetermined level into the molten plastic for assistance in molding the plastic article in conformity with the article-defining cavity;

maintaining the gas under pressure while the plastic solidifies in the article-defining cavity;

venting the pressurized gas; and removing the plastic article from the mold.

2. The method as defined in claim 1 wherein moving the movable part increases the volume of the flow path.

3. The method of claim 1 wherein moving the movable part causes controlled displacement of a boundary surface of the flow path.

4. The method of claim 3 wherein the displaceable boundary surface of the flow path is part of the movable part which bounds a portion of the flow path.

5. The method of claim 4 wherein the pressurized charge of molten plastic is injected by a ram, and the ram defines the movable part.

6. The method of claim 4 wherein the movable part comprises a pin with a tip bounding a portion of the flow path.

7. The method of claim 6 in which the pin has an extended position and a retracted position, and the volume of the flow path is increased by movement of the pin from the extended position to the retracted position.

8. The method of claim 1 wherein the charge of pressurized gas is introduced into the molten plastic upstream of the article-defining cavity.

9. The method of claim 1 wherein the step of venting the pressurized gas is carried out by mechanical interruption of the plastic in the flow path.

10. The method of claim 9 wherein the mechanical interruption of the plastic flow path is accomplished by extraction of a segment of plastic to relieve internal gas pressure.

11. The method of claim 1 wherein the step of venting the pressurized gas is carried out by removing support from a boundary portion of the plastic flow path to effect local rupture of the plastic at the boundary portion.

12. The method of claim 11 wherein said removing of boundary support is accomplished by movement of a reciprocable member having a surface defining such boundary support.

* * * * *